No. 625,325. Patented May 23, 1899.
J. CRAIG, JR.
REDUCING VALVE FOR AIR MOTORS.
(Application filed Mar. 25, 1898.)
(No Model.)
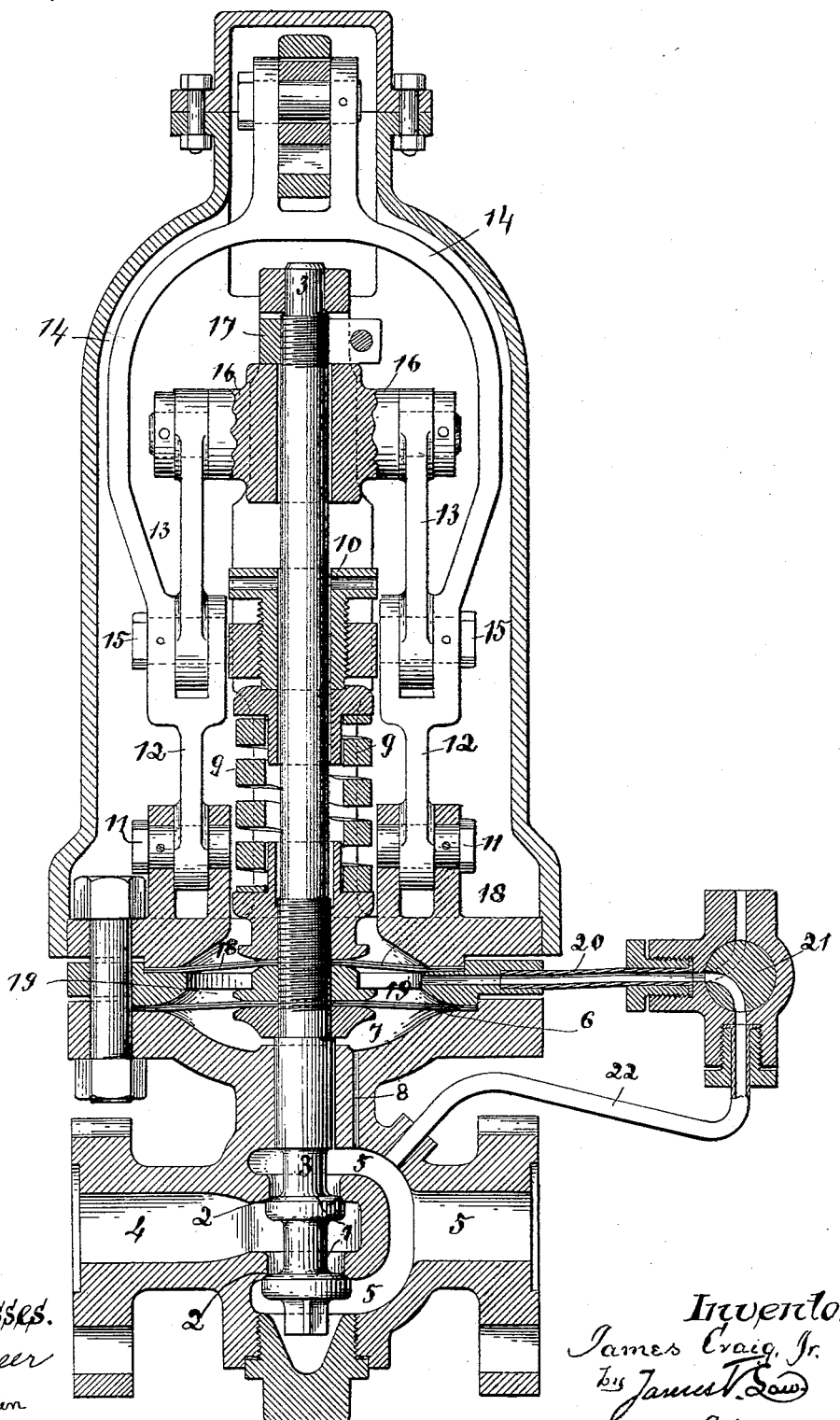
Witnesses.
J. E. Greer
C. Rathjen
Inventor.
James Craig, Jr.
by James V. Low
Attorney.

UNITED STATES PATENT OFFICE.

JAMES CRAIG, JR., OF NEW YORK, N. Y.

REDUCING-VALVE FOR AIR-MOTORS.

SPECIFICATION forming part of Letters Patent No. 625,325, dated May 23, 1899.

Application filed March 25, 1898. Serial No. 675,057. (No model.)

*To all whom it may concern:*

Be it known that I, JAMES CRAIG, Jr., a citizen of the United States of America, and a resident of the city of New York, State of New York, have invented certain new and useful Improvements in Reducing-Valves for Air-Motors, of which the following is a specification.

This invention relates to improvements in reducing-valves for air-motors and is intended to produce a valve that unites in itself the functions of a throttle-valve and of a reducing-valve, and has for a further object a reducing-valve in which the normal pressure at which the valve is set can be quickly and effectively increased and regulated at will by the motorman or operator.

This improvement is especially designed for use on street-railway cars, where on account of steep grades and curves in the road a force or power in the motor in excess of that delivered by the reducing-valve at its normal pressure is at times required to propel the car.

The accompanying drawing, illustrating my improvement, shows a side elevation of the valve, partly in section.

1 1 is the double valve, 2 2 the valve-seats, and 3 the valve-stem, extending upward through the casing.

4 is the inlet high-pressure port, and 5 the low-pressure delivery-port.

6 is a flexible diaphragm held in the casing and connected to the valve-stem, so as to move the latter. Below this diaphragm is a chamber 7, communicating by means of the channel 8 with the port 5, whereby the air acting on the bottom of the diaphragm is at the same degree of pressure as in the discharge-port. Above the diaphragm and arranged to press down upon the latter is a spiral spring 9, the upper end of which engages with the adjustable screw-sleeve 10, by which the pressure of the spring on the diaphragm can be set at any degree desired.

In the operation of the reducing-valve whenever the pressure of the air in the outlet-port 5 and in the chamber 7, connected with it, is less than the pressure at which the spring is set the spring acting on the diaphragm presses the latter down, thus causing the valve-stem to slide downward and open the valve. The air from the inlet-port 4, at a high pressure passing through the valves, fills the port 5 and chamber 7 and acting on the lower side of the diaphragm 6 forces it up, thus raising the valve-stem and shutting the valve and holding the latter closed until this quantity of highly-compressed air which has passed through the valves is reduced by expansion to the desired pressure or to a pressure less than that at which the spring is set, when the spring again opens the valve, and the above operation is repeated. Hence under the action of the spring and of the air at high pressure on the diaphragm 6 the reducing-valve is constantly opened and closed, whereby a continuous passage of air at the desired degree of pressure for use in the motor passes through the delivery-port.

Connected to the casing and engaging with the valve-stem is a toggle mechanism, by means of which the valve 1 1 is caused to operate as a throttle-valve. This toggle mechanism is similar to that described in my application for Letters Patent filed September 16, 1897, Serial No. 651,828.

Secured to the valve-casing by the bolts 11 11 is a toggle-joint consisting of the members 12 and 13 and the lever 14, connected together by the bolt 15. To member 13 is connected the cross-head 16, through which the valve-stem 3 passes and in which it freely slides. As will be understood from the drawing, when the lever 14 is moved over to one side the cross-head 16 is drawn down along the valve-stem, and when the lever is moved to a vertical position, as shown in the drawing, the cross-head is raised to its highest position.

On the upper end of the valve-stem above the cross-head is a nut 17, which is preferably screwed onto the stem, so as to be adjustable thereon. This nut is so situated on the stem that it bears against the cross-head 16 when the latter is raised. It follows that when the parts are in this position, as shown, with the cross-head in contact with the nut, the valve-stem cannot be pushed down under the action of the spring and the valve opened.

When it is desired to open the valve or to allow the air to pass through the reducing-valve, the cross-head 16 is drawn down away from the nut 17 by moving outward the lever 14, which is operated by suitable mechanism by the motorman. The valve-stem is now free to slide up and down and the valve to open and close, as above set forth.

To close the valve or shut off the passage of the air into the motor, the cross-head is pushed up close against the nut 17 by moving back the lever 15 to its vertical position, when the valve is brought against its valve-seat and held from opening.

It thus follows that with the mechanism above described the reducing-valve is caused to operate as a throttle-valve on starting and stopping the motor and a separate throttle-valve is rendered unnecessary.

While the tension of the spring 9 may be regulated by the screw-sleeve 10, so that the reduction-valve shall deliver air to the motor at any desired degree of pressure, it is very desirable to have some other means for regulating the pressure of the air delivered by the valve immediately under the control of the motorman in order that the latter can quickly increase the pressure of the air in the motor at those times when more power is required to propel the car. This valve-regulating mechanism herein is as follows: Connected to the valve-stem above the diaphragm 6 is a second flexible diaphragm 18, operated as in the case of the first diaphragm by the pressure of the air on its under surface and by the force of the spring above it. This diaphragm 18 has a less effective area or exposes a less surface to the pressure of the air than the diaphragm 6. The inclosed chamber 19 between the diaphragms communicates by means of a channel or conduit 20 and a suitable valve 21 either with the outside air or with the tube 22, leading from the delivery-port 5. In the construction shown in the drawing the valve 21 is a three-way cock, which is operated by any suitable mechanism from the end of the car by the motorman; but any form of cock or valve may be used that is found desirable.

In the ordinary operation of the reducing-valve when the air as delivered by the valve at the normal pressure is sufficient to operate the motor the three-way cock 21 is turned so that the conduit 20 communicates with the outer air and the chamber 19 is filled with atmospheric air. There is now no pressure on the upper diaphragm 18, and this diaphragm performs no function in the operation of the valve, the diaphragm merely moving up and down with the valve-stem. When, however, a greater pressure or more power is required in the motor, the cock 21 is turned, as shown, so that the conduit 20 connects with the tube 22 and the chamber 19 is in communication with the delivery-port 5 of the valve, and is thus filled with air at a pressure. As will be understood, as both the chambers 7 and 19 are now in communication with the delivery-port they both contain air at the same degree of pressure, and hence it follows that there is the same pressure on both sides of the diaphragm 6, and this diaphragm is thus balanced between the two equal pressures, and has no further effect in operating the valve. The effective diaphragm is now the upper diaphragm 18, which is operated by the pressure of the air in the chamber 19 and by the force of the spring 9. As the diaphragm 18, as before stated, is of less effective area than the diaphragm 6, it will require a greater pressure acting on this diaphragm to balance the force of the spring than was required on the other diaphragm, and hence it follows that the spring at the same tension will overcome a greater pressure acting on the diaphragm 18, and will thus force this diaphragm down and open the valve when the air in the delivery-port is at a greater degree of pressure than it would when acting with the diaphragm 6. For instance, if we suppose the spring to be set when operating with the diaphragm 6 to open the valve when the air in the delivery-port is at one hundred and fifty pounds pressure then the spring at the same tension when operating with the diaphragm 18 of less effective area will open the valve when the air in the delivery-port is at a greater pressure than one hundred and fifty pounds, or, we will say, at two hundred pounds, and thus cause the reducing-valve to deliver air at a greater pressure into the motor. Hence with this improvement by merely turning the cock or valve 21 so that the chamber 19 between the two diaphragms communicates with the delivery-port of the reducing-valve the pressure of the air delivered by the valve is increased above the normal pressure and more power is obtained in the motor. As soon as the necessity for the increase of power in the motor is at an end it is only necessary to turn the cock back so that the chamber 19 communicates with the outer atmosphere when the original operation of the valve with the diaphragm 6 is resumed and air at the normal pressure passes through the valve.

As will be understood the area of the diaphragm 18 may be regulated so that any desired increase in the pressure of the air may be obtained.

I do not claim herein the construction whereby the reducing-valve is made to operate a throttle-valve, as such improvement is claimed in my application mentioned above.

What I claim is—

1. In a reducing-valve, in combination a flexible diaphragm connected to and arranged to operate the valve; a second flexible diaphragm of less effective area, also connected to and arranged to operate the valve; and mechanism whereby either diaphragm is caused to operate the valve to vary the delivery-pressure, substantially as described.

2. In a reducing-valve for air-motors having a flexible diaphragm operated by a spring; the combination with the valve of a second diaphragm of less effective area; and mechanism whereby the second diaphragm is caused to operate the valve in place of the first and deliver air at an increased pressure, substantially as described.

3. In a reducing-valve for air-motors, in combination, the diaphragm 6 arranged to operate the valve; diaphragm 18 of less effective area also arranged to operate the valve; chamber 19 between the diaphragms and mechanism whereby the chamber is caused to communicate with the delivery-port of the valve and with the outside air and throw the separate diaphragms into and out of operation and thereby vary the delivery-pressure of the valve, substantially as described.

4. In a reducing-valve for air-motors, in combination, a diaphragm 6, arranged to operate the valve; a diaphragm 18 of less effective area, also arranged to operate the valve; spring 9 adapted to act upon both diaphragms to open the valve; chamber 19 between the diaphragms and means by which the chamber is caused to communicate with the outside air, whereby the valve is operated by diaphragm 6, or with the delivery-port, whereby the valve is operated by diaphragm 18 and the delivery-pressure of the valve increased, substantially as described.

JAMES CRAIG, Jr.

Witnesses:
C. J. RATHJEN,
M. WILSON.